Patented Feb. 12, 1952

2,585,064

UNITED STATES PATENT OFFICE 2,585,064

META-THIAZINES

Keith W. Wheeler, Wyoming, and Virgil W. Gash, Cincinnati, Ohio, assignors to The Wm. S. Merrell Company, Cincinnati, Ohio, a corporation of Delaware No Drawing. Application February 10, 1950, Serial No. 143,592

2 Claims. (Cl. 260—243)

This invention relates to new chemical compounds which are useful as central depressants.

The new compounds of the invention are 5 or 6 or 5,6-substituted derivatives of tetrahydro-m-thiazane-2,4-diones, in which 1, 2, 3 or 4 of the hydrogen atoms in the 5 and 6 positions is or are replaced by the hydrocarbon or substituted hydrocarbon groups, lower alkyl, phenyl, lower alkoxy substituted phenyl and lower alkyl substituted phenyl groups, which, if there is more than one such substituent, may be the same or different, and the corresponding compounds in which the 2-carbon atom, instead of being doubly linked to oxygen as in the ketone, is linked to the imino radical. The compounds may be used as the free acids, but, as the hydrogen linked to the nitrogen is acidic, they may be used in the form of the salts, obtained, for example, by replacing the nitrogen-linked hydrogen by an alkali metal, an equivalent of an alkaline earth metal, or other cation. In general, for pharmaceutical purposes, the compounds in which two of the four 5,6-hydrogens are replaced by lower aliphatic or the above aryl groups, and in which the 2-carbon atom is doubly linked to oxygen are of particular importance.

The new compounds may be represented by the type formula:

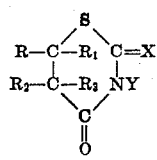

in which R, R1, R2 and R3 represent hydrogen, or lower alkyl, phenyl, lower alkoxy substituted phenyl, or lower alkyl substituted phenyl groups, with the requirement that at least one of the four is not hydrogen; X represents oxygen or the imino radical (=NH) and Y is hydrogen, or in the case of the salts, another cation.

These new chemical compounds are central nervous system depressants, pharmacologically similar to the barbiturates. The new compounds are among other things useful as hypnotics, sedatives and injectable anesthetics. They are also useful for antidoting and preventing convulsant manifestations. For example the 5-ethyl-6-phenyl-tetrahydro-m-thiazane -2,4-dione has a duration of action and toxicity which make it useful as a hypnotic and sedative. It has a higher therapeutic ratio than that of the commonly used barbiturates which constitutes an important advantage. Compounds with modifications of this action are obtained as the substituent groups are varied. For example the 5-propyl-6-phenyl- analogue possesses the characteristic of intravenous anesthetics.

In general, for therapeutic purposes, the compounds are administered orally, either as the free acids, or in the form of a salt. They may be administered by other routes as by injection, rectal suppository and the like, in which case they are used in the form of the water soluble, advantageously, alkali metal salts.

The new compounds of the invention may be prepared by the condensation of substituted beta-bromopropionic acids with thiourea, with production of the 2-imino compound, followed by hydrolysis to form the 2,4-dione, in accordance with the following type equation:

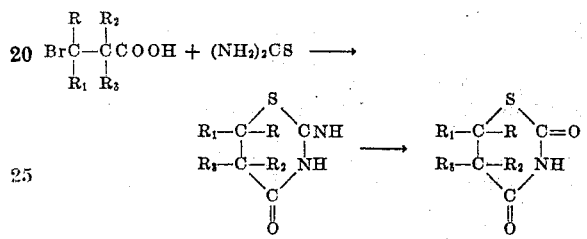

The invention will be further illustrated by the following specific examples giving detailed directions for the preparation of several of the compounds.

Example I

Hydrobromocinnamic acid, 10 gm., is added to a hot solution of 3.3 gm. of thiourea in 50 cc. of glacial acetic acid and the resulting solution is refluxed for 3½ hours. After cooling the solution is filtered, yielding a brown solid. This is washed with water and hot ethanol and recrystallized from methanol, giving the compound 2-imino-4-keto-6-phenyl-tetrahydro-m - thiazane, M. P. 214.8–216.8°. This compound is hydrolyzed by refluxing with 3 normal HCl for 30 minutes. Upon cooling the refluxed solution a precipitate is obtained, M. P. 140–145° C. (cor.) On recrystallization from ethanol and petroleum ether the pure compound, 6-phenyl - tetrahydro - m - thiazane-2,4-dione, M. P. 156–157° C. (Cor.) is obtained. This product is insoluble in aqueous sodium bicarbonate and sodium carbonate but dissolves in caustic soda solution, from which it is precipitated upon acidification. This product has substantial hypnotic properties, combined with low toxicity.

Example II 2-ethyl-3-bromo-3-phenylpropionic acid, 107 gm. and thiourea, 38 gm., are added to 150 cc. of glacial acetic acid and allowed to stand for 2 hours at room temperature. The solution is then heated on a steam bath for 3 hours and then refluxed for 30 minutes. It is then evaporated under vacuum to a syrupy residue, which is treated with water, washed with ether, and the aqueous solution neutralized with solid potassium carbonate to pH of 6-7. The imino compound which has the formula

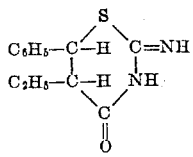

after being washed with water in hot ethanol melts at 184-185.5° C. This imino compound is refluxed with 10% hydrochloric acid for 1½ hours, and the resulting solution evaporated to dryness under vacuum. The residue is dissolved in hot ethanol and the product precipitated by the addition of water. After recrystallizing from ethanol, it is obtained as white crystals melting at 153-155° C. (cor.).

By the same procedure, 5-n-propyl-6-phenyltetrahydro-m-thiazane-2,4-dione, M. P. 163-164.5°, was obtained by hydrolysis of the crude 2-imino intermediate, M. P. 162-6° (decompn.), which in turn was obtained from the condensation of thiourea and 2-n-propyl-3-bromo-3-phenylpropionic acid. The bromo acid was obtained by the addition of HBr to 2-n-propylcinnamic acid. By the same procedure, 5-isopropyl-6-phenyltetrahydro-m-thiazane-2,4-dione, M. P. 165-167°, was obtained from the intermediate 2-imino compound, M. P. 196-197° (decompn.) which in turn was prepared by the condensation of thiourea and 2-isopropyl-3-bromo-3-phenylpropionic acid. The bromo acid was obtained by the addition of HBr to 2-isopropylcinnamic acid. Using the same procedure, 5-n-butyl-6-phenyltetrahydro-m-thiazane-2,4-dione, M. P. 124.5-126°, was obtained from the intermediate 2-imino compound, M. P. 194-8° (decompn.), which in turn was obtained by condensing thiourea with 2-n-butyl-3-bromo-3-phenylpropionic acid. The bromo acid was obtained by the addition of HBr to 2-n-butylcinnamic acid. By the same procedure 6-n-butyltetrahydro-m-thiazane-2,4-dione, M. P. 74-75.5° was obtained from the hydrolysis of the 2-imino derivative, M. P. 138-140°, which was obtained from thiourea and 3-bromoheptanoic acid.

Other compounds of the invention include 5-ethyl-5-phenyl-tetrahydro-m-thiazane-2,4-dione, which exists as white crystals, and the corresponding imino compound, obtained from thiourea and 2-ethyl-2-phenyl-3-bromo-propionic acid; 6-ethyl-6-phenyl-tetrahydro-m-thiazane, 2,4-dione, which exists as white crystals, and the corresponding imino compound, obtained from thiourea and 3-phenyl-3-ethyl-3-bromopropionic acid; 5-phenyl-6-ethyl-tetrahydro-m-thiazane-2,4-dione, which exists as white crystals, and the corresponding imino compound, obtained from thiourea and 2-phenyl-3-ethyl-3-bromopropionic acid; 5-ethyl-5-n-butyl-tetrahydro-m-thiazane-2,4-dione, which exists as white crystals, and the corresponding imino compound, obtained from thiourea and 2-ethyl-2-n-butyl-3-bromopropionic acid; 5-ethyl-6-n-butyl-tetrahydro-m-thiazane-2,4-dione, which exists as white crystals, and the corresponding imino compound, obtained from thiourea and 2-ethyl-3-bromo-heptoic acid; 6-ethyl-5-n-butyl-tetrahydro-m-thiazane-2,4-dione, which exists as white crystals, and the corresponding imino compound, obtained from thiourea and 2-n-butyl-3-bromovaleric acid; 5-ethyl-6-n-propyltetrahydro-m-thiazane-2,4-dione, which exists as white crystals, and the corresponding imino compound, obtained from thiourea and 2-ethyl-3-bromocaproic acid; 5-ethyl-6-propyltetrahydro-m-thiazane-2,4-dione, which exists as white crystals, and the corresponding imino compound obtained from thiourea and 2-ethyl-3-bromo-4-phenylbutyric acid; 5-ethyl-6-p-methoxyphenyltetrahydro-m-thiazane-2,4-dione, which exists as white crystals, and the corresponding imino compound, obtained from thio-urea and 2-ethyl-3-bromo-3-p-methoxyphenylpropionic acid; 5-ethyl-6-p-methylphenyltetrahydro-m-thiazane-2,4-dione, which exists as white crystals, and the corresponding imino compound, obtained from thiourea and 2-ethyl-3-bromo-3-p-methylphenylpropionic acid; 5,5-diethyl-6-phenyltetrahydro-m-thiazane-2,4-dione, which exists as white crystals, and the corresponding imino compound, obtained from thiourea and alpha,alpha-diethyl-beta-bromocinnamic acid; 5-phenyl-6,6-diethyl-tetrahydro-m-thiazane-2,4-dione, which exists as white crystals, and the corresponding imino compound, obtained from thiourea and 2-phenyl-3-ethyl-3-bromovaleric acid; 5,5-diethyl-6,6-diethyltetrahydro-m-thiazane-2,4-dione, which exists as white crystals, and the corresponding imino compound; and obtained from thiourea and 2,2-diethyl-3-bromo-3-ethylvaleric acid; 5-ethyl-5-phenyl-6-ethyl-6-phenyltetrahydro-m-thiazane-2,4-dione, which exists as white crystals, and the corresponding imino compound, obtained from thiourea and 2-ethyl-2-phenyl-3-bromo-3-phenylvaleric acid.

Of the various compounds of the invention, the di-substituted compounds, that is, the compounds in which two of the four 5- and 6-hydrogen atoms of the ring structure are replaced by hydrocarbon groups, particularly where at least one of the substituent groups is phenyl, are of particular advantage for hypnotic purposes.

We claim:

1. Compounds of the formula

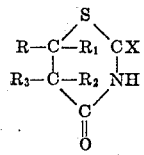

in which R, R₁, R₂ and R₃ are selected from the class consisting of hydrogen, lower alkyl, phenyl, lower alkoxy substituted phenyl, and lower alkyl substituted phenyl radicals, with the proviso that at least one is selected from the group consisting of lower alkyl, phenyl, lower alkoxy substituted phenyl and lower alkyl substituted phenyl, and X is a radical selected from the group consisting of =O and =NH.

2. 5-ethyl-6-phenyl-tetrahydro-m-thiazane-2,4-dione.

KEITH W. WHEELER.
VIRGIL W. GASH.

(References on following page)

REFERENCES CITED

The following references are of record in the file of this patent:

UNITED STATES PATENTS

| Number | Name | Date |
|---|---|---|
| 2,086,136 | Messer | July 6, 1937 |
| 2,170,059 | Mathes | Aug. 22, 1939 |
| 2,440,095 | Jansen | Apr. 20, 1948 |
| 2,514,004 | Mathes | July 4, 1950 |

FOREIGN PATENTS

| Number | Country | Date |
|---|---|---|
| 890,935 | France | Feb. 22, 1944 |

OTHER REFERENCES

Gresham et al.: Jour. Amer. Chem. Soc., vol. 70 (1948), pp. 1001 and 1002.

Holmberg: Ber. der deu Chem., vol. 47 (1914), pp. 159–165.